(12) United States Patent
Tao et al.

(10) Patent No.: US 12,369,104 B2
(45) Date of Patent: *Jul. 22, 2025

(54) APPARATUS SYSTEM AND METHOD FOR ACQUISITION OF ON-DEMAND SYSTEM INFORMATION

(71) Applicant: Panasonic Intellectual Property Corporation of America, Torrance, CA (US)

(72) Inventors: Ming-Hung Tao, Frankfurt am Main (DE); Rikin Shah, Dreieich (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,863

(22) Filed: Sep. 25, 2023

(65) Prior Publication Data

US 2024/0015801 A1  Jan. 11, 2024

Related U.S. Application Data

(63) Continuation of application No. 17/830,154, filed on Jun. 1, 2022, now Pat. No. 11,805,557, which is a (Continued)

(30) Foreign Application Priority Data

May 10, 2018 (EP) .................................... 18171719

(51) Int. Cl.
*H04W 74/0833* (2024.01)
*H04W 48/12* (2009.01)
(Continued)

(52) U.S. Cl.
CPC ....... *H04W 74/0833* (2013.01); *H04W 48/12* (2013.01); *H04W 48/14* (2013.01); *H04W 74/006* (2013.01)

(58) Field of Classification Search
None
See application file for complete search history.

(56) References Cited

U.S. PATENT DOCUMENTS 10,939,362 B2   3/2021  Lin et al.
10,973,000 B2*  4/2021  Jia .......................... H04W 76/27
(Continued)

FOREIGN PATENT DOCUMENTS

CA     3045809 A1      11/2019
WO  WO 2016198909 A1  12/2016
(Continued)

OTHER PUBLICATIONS

3GPP TR 38.801 V2.0.0, "3rd Generation Partnership Project; Technical Specification Group Radio Access Network; Study on New Radio Access Technology; Radio Access Architecture and Interfaces (Release 14)," Mar. 2017. (90 pages).

(Continued)

*Primary Examiner* — Hong S Cho
(74) *Attorney, Agent, or Firm* — Seed IP Law Group LLP

(57) ABSTRACT

The present disclosure relates to a mobile terminal and base station and respective operation methods. The mobile terminal comprises circuitry, which in operation, determines a condition for requesting on-demand a transmission of other system information; performs a random access procedure; and receives via broadcast a system information message including the on-demand requested other system information. The system information request message of the random access procedure includes an information element with a bit-pattern conforming to a specific format with at least a (Continued)

part of the bit-pattern for requesting the other system information. And the contention resolution message of the random access procedure includes the same, or the same part of the bit-pattern for detecting collisions during the random access procedure.

4 Claims, 8 Drawing Sheets

Related U.S. Application Data continuation of application No. 17/045,717, filed as application No. PCT/EP2019/057778 on Mar. 27, 2019, now Pat. No. 11,395,347.

(51) Int. Cl.
*H04W 48/14* (2009.01)
*H04W 74/00* (2009.01)

(56) References Cited

U.S. PATENT DOCUMENTS

| | | | |
|---|---|---|---|
| 11,284,420 B2* | 3/2022 | Lin | H04W 74/002 |
| 2017/0311285 A1 | 10/2017 | Ly et al. | |
| 2018/0132168 A1* | 5/2018 | Ingale | H04W 72/23 |
| 2018/0270855 A1 | 9/2018 | Loehr et al. | |

FOREIGN PATENT DOCUMENTS

| | | |
|---|---|---|
| WO | WO 2017197063 A1 | 11/2017 |
| WO | WO 2018028670 A1 | 2/2018 |
| WO | WO 2018143735 A1 | 8/2018 |
| WO | WO 2019031954 A1 | 2/2019 |

OTHER PUBLICATIONS

3GPP TR 38.913 V14.1.0, "3rd Generation Partnership Project; Technical Specification Group Radio Access Network; Study on Scenarios and Requirements for Next Generation Access Technologies; (Release 14)," Dec. 2016. (38 pages).

3GPP TS 38.300 V15.1.0, "3rd Generation Partnership Project; Technical Specification Group Radio Access Network; NR; NR and NG-RAN Overall Description; Stage 2 (Release 15)," Mar. 2018. (71 pages).

3GPP, "3rd Generation Partnership Project; Technical Specification Group Radio Access Network; NR; Medium Access Control (MAC) protocol specification (Release 15)," 3GPP TS 38.321 V15.13.0, Mar. 2022. (79 pages).

Chinese Office Action dated May 13, 2023, for the corresponding Chinese Patent Application No. 201980031111.X, 13 pages. (With English Translation).

Communication pursuant to Article 94(3) EPC, dated Apr. 8, 2021, for European application No. 18171719.0. (11 pages).

English Translation of Japanese Office Action, dispatched Feb. 14, 2023, for Japanese Patent Application No. 2020-561866. (12 pages).

Extended European Search Report, dated Jul. 11, 2018, for European Application No. 18171719.0. (12 pages).

Huawei, HiSilicon, "Design on MSG1 based request and failure handling," R2-1705175, Agenda Item: 10.4.1.5, 3GPP TSG-RAN WG2 #98, Hangzhou, China, May 15-19, 2017. (3 pages).

Huawei, HiSilicon, "MSG3 based other SI acquisition," R2-1805225, Agenda Item: 10.4.1.6.6, 3GPP TSG-RAN WG2 101bis, Sanya, China, Apr. 16-20, 2018. (4 pages).

Huawei, HiSilicon, "On demand SI acquisition and failure handling," R2-1710463, Revision of R2-1708072, Agenda Item: 10.4.1.6.6, 3GPP TSG-RAN WG2 Meeting #99bis, Prague, Czech Republic, Oct. 9-13, 2017. (8 pages).

Intel Corporation, "Remaining issues on on-demand System Information," R2-1802960, Agenda Item: 10.4.1.6.6, 3GPP TSG-RAN WG2 meeting #101, Athens, Greece, Feb. 26-Mar. 2, 2018. (6 pages).

International Search Report, mailed Apr. 12, 2019, for International Application No. PCT/EP2019/057778. (3 pages).

Lenovo et al., "On demand SI Request remaining FFS," R2-1803392, Resubmission of R2-1803392, Agenda item: 10.4.1.6.6, 3GPP TSG-RAN WG2 Meeting #101, Athens, Greece, Feb. 26-Mar. 2, 2018. (3 pages).

Lenovo et al., "Resolving remaining FFSs," R2-1710161, resubmission of R2-1708063, Agenda item: 10.4.1.6.6, 3GPP TSG-RAN WG2 Meeting #99 bis, Prague, Czech Republic, Oct. 9-13, 2017. (3 pages).

Samsung Electronics, "SI Request Ack Indication for Msg3 based SI Request," R2-1806833, 3GPP TSG-RAN2 102, Busan, South Korea, May 21-25, 2018. (3 pages).

Samsung, "Miscellaneous corrections," R2-1809200, 3GPP TSG-RAN WG2 Meeting #102, Busan, Korea, May 21-25, 2018. (75 pages).

Samsung, "On Demand SI: Remaining Issues," R2-1801882, Agenda Item: 10.4.1.6.6, 3GPP TSG-RAN2 101, Athens, Greece, Feb. 26-Mar. 2, 2018. (5 pages).

Samsung, "Remaining Issues for Msg3 based SI Request," R2-1806832, Agenda item: 10.3.1.4.3, 3GPP TSG-RAN2 102, Busan, South Korea, May 21-25, 2018. (4 pages).

Spreadtrum Communications, "Consideration on Remaining Issues of On-Demand Si," R2-1801978, Agenda item: 10.4.1.6.6, 3GPP TSG-RAN WG2#101, Athens, Greece, Feb. 26-Mar. 2, 2018. (4 pages).

Vivo, "Stored system information in NR," R2-1800871, revision of R2-1712768, Agenda Item: 10.4.1.6.2, 3GPP TSG-RAN WG2 NR Ad hoc 1801, Vancouver, Canada, Jan. 22-26, 2018. (4 pages).

ZTE, "Further consideration on the Msg3 Content," R2-1802037, Agenda item: 10.4.1.6.6, 3GPP TSG-RAN WG2 Meeting #101, Athens, Greece, Feb. 26-Mar. 2, 2018. (7 pages).

* cited by examiner

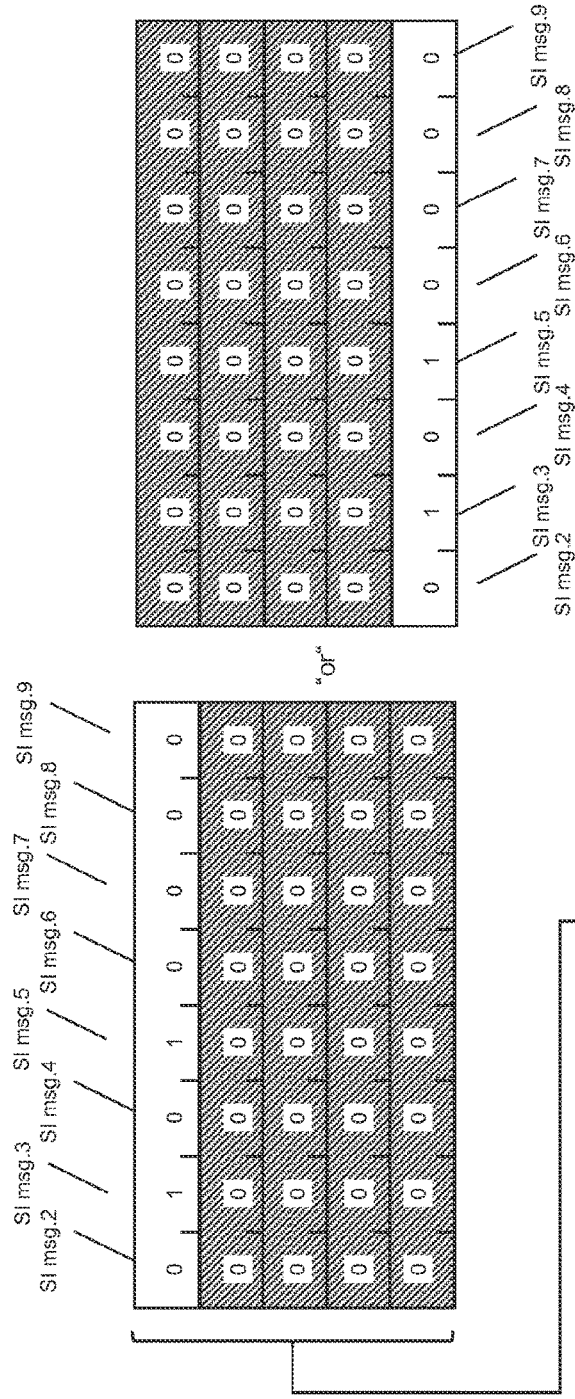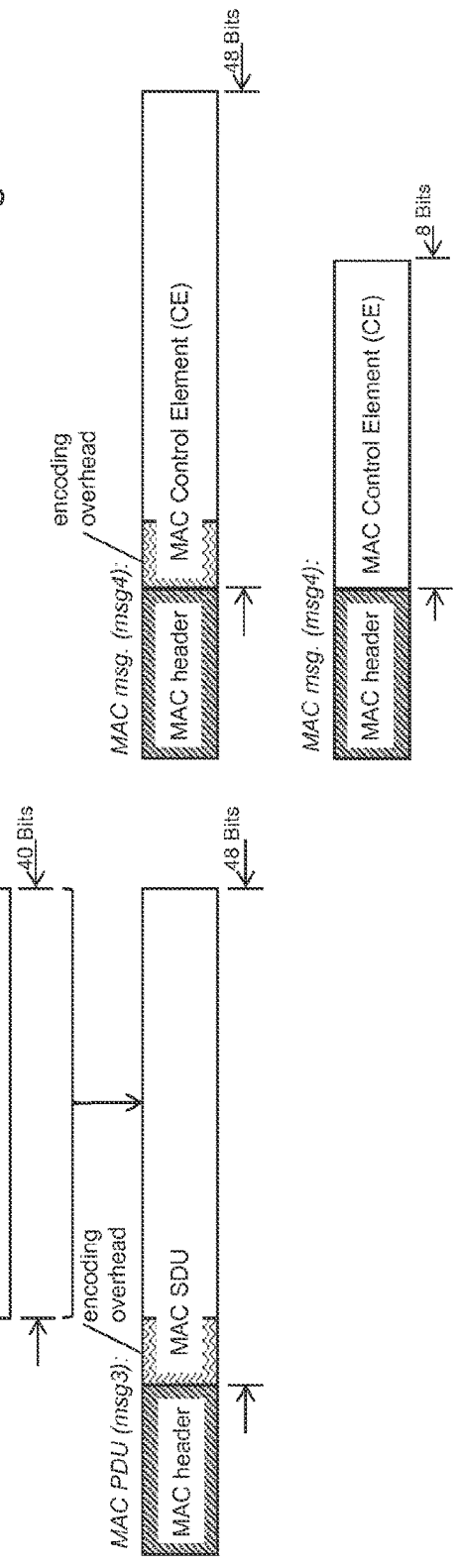
Fig. 3

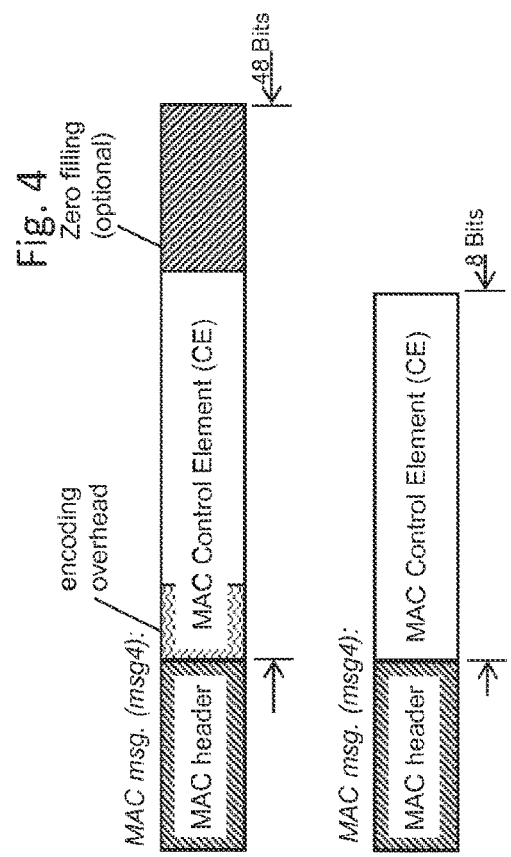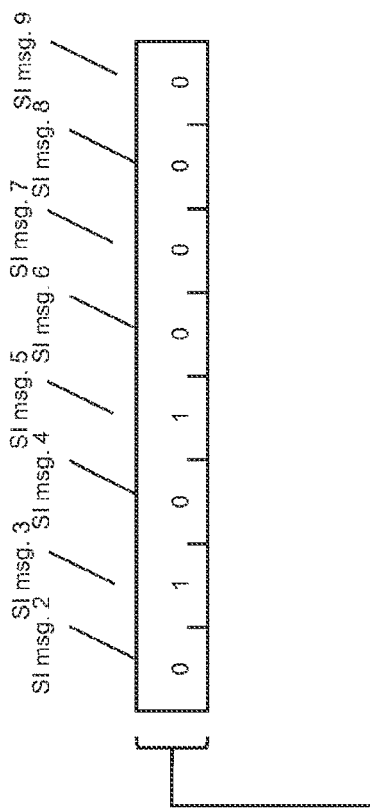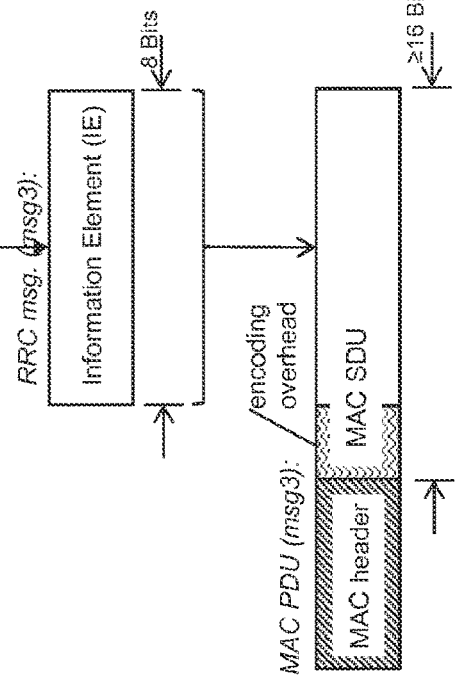
Fig. 4

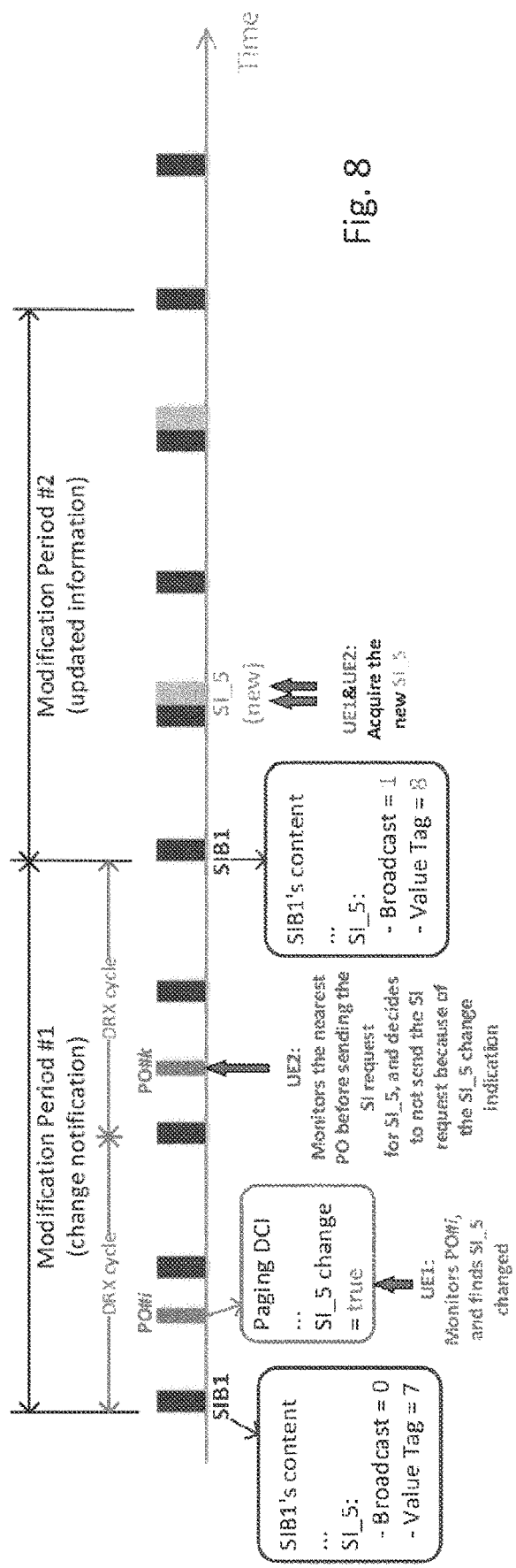

APPARATUS SYSTEM AND METHOD FOR ACQUISITION OF ON-DEMAND SYSTEM INFORMATION

BACKGROUND

Technical Field

The present disclosure relates to a mobile terminal performing system information acquisition in a wireless communication system comprising at least one base station configured with a serving cell. The system information includes minimum information and other system information. The mobile terminal transmits on-demand a request message to the base station. This request message requests the base station to transmit the other system information.

Description of the Related Art

Currently, the 3rd Generation Partnership Project (3GPP) focuses on the next release (Release 15) of technical specifications for the next generation cellular technology, which is also called fifth generation (5G) or new radio (NR).

At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and the study has laid the foundation of the Release 15 work item (WI) which will define the first standard.

One objective of 5G new radio (NR) is to provide a single technical framework addressing all usage scenarios, requirements and deployment scenarios defined in 3GPP TSG RAN TR 38.913 v14.1.0, "Study on Scenarios and Requirements for Next Generation Access Technologies," December 2016 (available at www.3gpp.org). These include at least enhanced mobile broadband (eMBB), ultra-reliable low-latency communications (URLLC), massive machine type communication (mMTC).

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks.

Another objective is the forward compatibility, anticipating future use cases/deployment scenarios. The backward compatibility to Long Term Evolution (LTE) is not required, which facilitates a completely new system design and/or the introduction of novel features.

BRIEF SUMMARY

One non-limiting and exemplary embodiment enables improving the system information acquisition in a wireless communication system comprising a mobile terminal and a base station with a serving cell. Another non-limiting exemplary embodiment strives to reduce the (control) signaling overhead to the acquisition of on-demand other system information. And a further exemplary embodiment strives to improve the flexibility in the acquisition of on-demand other system information.

In one embodiment, the techniques disclosed here feature a mobile terminal for performing system information acquisition in a wireless communication system comprising at least one base station configured with a serving cell. The system information includes minimum system information and other system information.

The mobile terminal comprises a processor and a transceiver. With this, the mobile terminal is adapted to determine a condition for requesting on-demand a transmission of other system information; perform a random access procedure including: transmitting a random access preamble signal (msg1), receiving a random access response message (msg2), transmitting a system information request message (msg3) for the other system information, and receiving a contention resolution message (msg4); and receive via broadcast a system information message including the on-demand requested other system information.

The system information request message (msg3) includes an information element with a bit-pattern conforming to a specific format with at least a part of the bit-pattern for requesting the other system information, and the contention resolution message (msg4) includes the same, or the same part of the bit-pattern for detecting collisions during the random access procedure.

It should be noted that general or specific embodiments may be implemented as a system, a method, an integrated circuit, a computer program, a storage medium, or any selective combination thereof.

Additional benefits and advantages of the disclosed embodiments will be apparent from the specification and Figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 3 shows an exemplary request and response message configuration for other system information in an exemplary implementation of the first embodiment in a 3GPP NR deployment scenario;

FIG. 4 depicts another exemplary request and response message configuration for other system information in an exemplary implementation of the first embodiment in a 3GPP NR deployment scenario;

FIG. 8 depicts a timing diagram of two mobile terminals (i.e., UE1 and UE2) performing system acquisition in a third example of the second aspect in a 3GPP NR deployment scenario.

DETAILED DESCRIPTION

Figure 1:
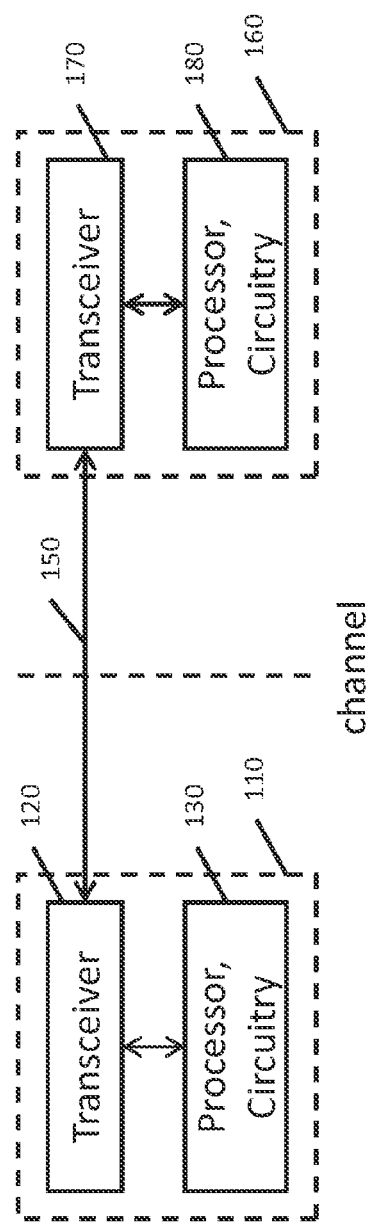
FIG. 1 depicts a block diagram of a mobile terminal, and a base station in a wireless communication system.

As summarized in one of the technical reports for the NR study item (3GPP TSG TR 38.801 v2.0.0, "Study on New Radio Access Technology; Radio Access Architecture and Interfaces," March 2017), the fundamental physical layer signal waveform will be based on Orthogonal Frequency Division Multiplexing (OFDM). For both downlink and uplink, OFDM with cyclic prefix (CP-OFDM) based waveform is supported. Discrete Fourier Transformation (DFT) spread OFDM (DFT-S-OFDM) based waveform is also supported, complementary to CP-OFDM waveform at least for eMBB uplink for up to GHz.

One of the design targets in NR is to enhance the user's mobility with minimizing the interruption of ongoing traffic if any, and at the same time without increasing the user equipment power consumption. At RAN #78, RAN2 was tasked to investigate how the IMT-2020 requirement on 0ms handover interruption time can be addressed for LTE and NR within the Rel-15 time frame. At a first step, handover procedure in LTE has been adopted as a baseline design in NR. There are ongoing discussions in 3GPP working groups regarding what functionalities need to be added or modified for NR mobility enhancement.

The term "downlink" refers to communication from a higher node to a lower node (e.g., from a base station to a relay node or to a UE, from a relay node to a UE, or the like). The term "uplink" refers to communication from a lower node to the higher node (e.g., from a UE to a relay node or to a base station, from a relay node to a base station, or the like). The term "sidelink" refers to communication between nodes at the same level (e.g., between two UEs, or between two relay nodes, or between two base stations).

In 3GPP NR, the acquisition of system information has greatly improved over mechanisms known from the former versions of, for example, the LTE standards. For example, system information handling discussed in chapter 7.3 of 3GPP TS 38.300 V15.1.0: "NR; NR and NG-RAN Overall Description" March 2018. Only a brief discussion will follow herein below.

Overview

According to the standardization of 3GPP NR, System Information (SI) is divided into Minimum SI and Other SI. Minimum SI is periodically broadcast and comprises basic information required for initial access and information for acquiring any other SI broadcast periodically or provisioned on-demand, i.e., scheduling information. The Other SI encompasses everything not broadcast in the Minimum SI and may either be broadcast, or provisioned in a dedicated manner, either triggered by the network or upon request from the UE.

For a cell/frequency that is considered for camping by the UE, the UE is not required to acquire the contents of the minimum SI of that cell/frequency from another cell/frequency layer. This does not preclude the case that the UE applies stored SI from previously visited cell(s). If the UE cannot determine the full contents of the minimum SI of a cell (by receiving from that cell or from valid stored SI from previous cells), the UE shall consider that cell as barred. In case of Bandwidth Adaptation (BA), the UE only acquires SI on the active Bandwidth Part (BWP).

Scheduling

The Minimum SI is transmitted over two different downlink channels using different messages (MasterInformationBlock and SystemInformationBlockType1). The term Remaining Minimum SI (RMSI) is also used to refer to SystemInformationBlockType1 (SIB1). Other SI is transmitted in SystemInformationBlockType2 (SIB2) and above.

For UEs in RRC_IDLE and RRC_INACTIVE, the request triggers a random access procedure and is carried over MSG3 unless the requested SI is associated to a subset of the PRACH resources, in which case MSG1 can be used. When MSG1 is used, the minimum granularity of the request is one SI message (i.e., a set of SIB s), one RACH preamble and/or PRACH resource can be used to request multiple SI messages and the gNB acknowledges the request in MSG2. When MSG 3 is used, the gNB acknowledges the request in MSG4.

The Other SI may be broadcast at a configurable periodicity and for a certain duration. The Other SI may also be broadcast when it is requested by UE in RRC_IDLE/RRC_INACTIVE.

Each cell on which the UE is allowed to camp broadcasts at least some contents of the Minimum SI, while there may be cells in the system on which the UE cannot camp and do not broadcast the Minimum SI.

SI Modification

Change of system information only occurs at specific radio frames, i.e., the concept of a modification period is used. System information may be transmitted a number of times with the same content within a modification period, as defined by its scheduling. The modification period is configured by system information.

When the network changes (some of the) system information, it first notifies the UEs about this change, i.e., this may be done throughout a modification period. In the next modification period, the network transmits the updated system information. Upon receiving a change notification, the UE acquires the new system information from the start of the next modification period. The UE applies the previously acquired system information until the UE acquires the new system information.

Paging is used to inform UEs in RRC_IDLE, RRC_INACTIVE and in RRC_CONNECTED about a system information change. If the UE receives such paging message, it knows that the system information (other than for ETWS/CMAS) will change at the next modification period boundary.

In addition to the 3GPP NR technical standard TS 38.300, which reflects the development efforts of RAN #79, the system information handling has also been more recently discussed by the TSG Radio Access Network (TSG-RAN) Work Group 2 (WG2) which is briefly summarized in the following:

SI Provided by Broadcast

The scheduling information for other SI includes SIB type, validity information, periodicity, and SI-window information in minimum SI irrespective of whether other SI is periodically broadcasted or provided on demand The scheduling information for other SI is provided in SIB1

SIB type: broadcast or on-demand

If minimum SI indicates that a SIB is not broadcasted, then UE does not assume that this SIB is a periodically broadcasted in its SI-Window at every SI-Period. Therefore, the UE may send an SI request to receive this SIB. After sending the SI request, for receiving the requested SIB, UE monitors the SI window of requested SIB in one or more SI periods of that SIB.

Msg3 Based SI Request Method

UE determines successful Msg3 based on reception of Msg4. It remains for further study (FFS) as to what details of the Msg4 content are used to confirm successful Msg3. This is to be discussed initially by CP.

Preamble(s) for SI request using Msg3 based Method are not reserved. Further, RRC signaling is used for SI request in Msg3. It is also left for further study (FFS) by ASN.1 work as to how RRC signaling indicates the requested SI/SIB details. Temporary C-RNTI received in Msg2 is used for Msg4 reception.

On-Demand SI Request

UE ID is not included in MSG3. For contention resolution UE MAC performs same as other cases and check the contention resolution MAC CE against the transmitted request (common RACH procedure in MAC)

One indicator in SystemInformationBlockType1 (SIB1) indicates whether an SI message is currently broadcast or not. The indication is valid until the end of the modification period. UE cannot infer whether this is a temporary broadcast of an on demand SI or a periodic broadcast SI.

SI Modification

Like LTE, the SI change/update is indicated to UEs through paging. RRC_IDLE and RRC_INACTIVE UEs shall monitors for SI update notification in its own paging occasion every DRX cycle. RRC_CONNECTED UE monitors for SI update notification in any paging occasion (if the UE is provided with common search space to monitor paging in connected).

In NR, the LTE concept of modification period for SI update handling is adopted. SI update indication included in paging message is supported (this can be revisited if the DCI design allows the SI update indication and scheduling of a paging message in parallel). SI update indication included in DCI is supported.

If UE receives SI update indication in paging, then UE acquires the updated SI at the next modification period boundary assuming NW broadcasts updated SI (even if the updated SI is on-demand SI).

Present Disclosure

Considering the above, the present disclosure has been conceived with the understanding that that system information acquisition can be further improved.

Particularly, utilizing the random access procedure in 3GPP NR for acquiring on-demand system information has some advantages as well as drawbacks on the (control) signaling overhead for the wireless communication system. The drawbacks resulting from this feature are at the focus of the present disclosure.

On the one hand, the random access procedure is a well-understood mechanism, which allows a mobile terminal to start immediately signaling (control) information with a base station. Specifically the random access procedure can be engaged by the mobile terminal irrespective of whether it is in a RRC CONNECTED, RRC_IDLE or RRC_INACTIVE state. In other words, the random access procedure for acquiring on-demand system information can be used immediately after power-up.

On the other hand, the random access procedure introduces a considerable (control) signaling overhead. As will be discussed in further detail below, the random access procedure (i.e., contention-based random access procedure) is well understood to include a sequence of four messages (henceforth: msg1, msg2, msg3 and msg4). This sequence of four messages is designed to enable a reliable signaling between mobile terminal and base station, however, at the expense of a non-negligible (control) signaling overhead.

Recognizing these shortcomings, the present disclosure strives to improve the system information acquisition in the wireless communication system.

Non-limiting and exemplary embodiments enable reducing in the wireless communication system the (control) signaling overhead resulting from the random access procedure, specifically in situations where collisions occur between different mobile terminal's system information acquisition attempts. In particular, the present disclosure tries to avoid any unnecessary re-transmissions triggered by unsuccessful (i.e., contentious) system information acquisition attempts.

For a comprehensive discussion of the advantages provided by the present disclosure, two different scenarios are described in further detail below.

In a first scenario, emphasis is laid on the fact that the cause for the (control) signaling overhead, i.e., the understanding that collisions in the random access procedure have occurred, is eliminated. For this, the random access procedure assumes, when acquiring system information, a different understanding of what collisions are. Thereby, additional (control) signaling is avoided that would normally result in re-transmissions as prescribed by the contention resolution mechanism in the random access procedure.

In second scenario, emphasis is laid on the fact that the effect resulting in the (control) signaling overhead, i.e., the re-transmissions as prescribed by the contention resolution mechanism, can be removed for the system information acquisition without affecting the functional capability of the wireless communication system. For this, specific conditions are defined where it is not necessary to invoke the content resolution mechanism in the random access procedure, thus also avoiding the additional (control) signaling.

In other words, the two different scenarios of the present disclosure are linked by a cause-and-effect relationship in that they both solve the common technical problem of avoiding additional (control) signaling, unless ultimately necessary in the wireless communication system. The (control) signaling overhead resulting from the contention resolution mechanism in the random access procedure is accordingly reduced.

The random access procedure (more specifically the contention-based random access procedure) includes four steps which are briefly discussed in the following:

In a first step, a random access preamble signal, i.e., msg1, (in-short: preamble) is transmitted by a mobile terminal to the base station. The preamble is randomly selected by the mobile terminal from all available or a specific subset of available preambles and/or is transmitted on all available or specifically selected physical random access channel, PRACH, resources.

Due to restrictions on the number of available preambles and/or PRACH resources (the resource in a specific time and spectrum frequency), and due to the fact that the mobile terminal autonomously starts the random access procedure, contentions between preamble transmissions from two different mobile terminals cannot be avoided. In other words, the wireless communication system cannot prevent a situation where two different mobile terminals are transmitting a same preamble on a same PRACH resource.

Additionally and even more importantly, the base station cannot distinguish between such contentious transmissions as they result from two different mobile terminals transmitting a same preamble on a same PRACH resource. Thus, the base station requires external knowledge to discover such contentious transmissions.

In a second step, a random access response message, i.e., msg2, (in-short: response) is transmitted by the base station to the mobile terminal. The response generally includes parameters for connection establishment, such as for example a timing advance to be applied to the mobile terminal's uplink configuration, as well as a scheduling grant, which permits the mobile terminal to transmit the subsequent message in the uplink.

In a third message, a dedicated message, i.e., msg3, is transmitted by the mobile terminal to the base station using the scheduling grant. For the sake of brevity, reference is made in the following only to the system information request message, i.e., a message which serves the dedicated purpose of a mobile terminal signaling to the base station the request for the transmission of (specific) on-demand system information, for example a (specific) on-demand system information message.

In an exemplary implementation, the system information request message may include a request for acquiring a (specific) on-demand system information message, e.g., a request for an on-demand transmitted message comprising system information block type 4-6. In general, the system information request message follows a specific format specified by the radio resource control, RRC, layer, for example, for an RRC System Information Request message.

As the two different mobile terminals causing the contentious transmissions in step 1, receive the same response in step 2, they will both transmit a dedicated messages, i.e., msg3, using the indicated scheduling grant. Accordingly, the two dedicated messages are also received by the base station as contentions transmissions, i.e., as messages conflicting or overlapping in time and spectrum frequency, and (if at all) only one of the dedicated messages can be successfully decoded by the base station.

Even more importantly, it has been discovered that at specific timings (e.g., during radio frames and/or sub-frames with specific numbers), there is a high likelihood that the two different mobile terminals, causing the contentious transmissions in step 1, are both transmitting as msg3 a request for acquiring a same on-demand system information message. Thus, there may be situations in which the base station receives two conflicting or overlapping system information request message transmissions requesting the same or different on-demand system information message.

Again and more importantly, the base station can only recognize one of the system information request messages from the mobile terminal whose signal is stronger.

In a fourth message, a connection resolution message, i.e., msg4, is transmitted by the base station to the mobile terminal(s). This message is designed to put the mobile terminal in a situation where it can detect whether or not the base station intends to comply with the request set out in the dedicated message transmitted in msg3. In other words, this msg4 comprises information which uniquely references msg3 or the mobile terminal generating same msg3, and for this reason may serve the purpose of resolving situations with contentious transmissions.

Notably, the capability of the mobile terminal to discover and thus resolve a situation with contentious transmissions depends on the information transmitted in the dedicated message, i.e., msg3. Particularly, this capability ties in with the question of whether or not the msg3 includes additionally or only information which is unique between all mobile terminals.

Conventionally, this msg3 is formatted to include, for example, a unique random value (i.e., random value information element) in the context of a RRC connection request. This unique random value then ensures that two msg3s are never the same (i.e., are unique), even if they originate from two different mobile terminals utilizing the same scheduling grant from msg2.

Then, the base station generates the contention resolution message by copy-and-pasting (or echoing) the unique information from the msg3, thereby permitting the mobile terminal to discover whether it has succeeded in placing its request set out in the dedicated message transmitted as msg3.

Only when a mobile terminal discovers in msg4 the unique information which it has transmitted with msg3, then it can conclude that msg3 was transmitted successfully to the base station. Should the mobile terminal have been unsuccessful, the random access procedure prescribes it starts again with the re-transmission of the random access preamble signal, i.e., msg1. Thereby, situations with contentious transmissions are resolved.

Now, in the context of the present disclosure it is recognized that a contention resolution is not always favorable in the context of system information acquisition. In particular, there are situations where it is un-necessary for a mobile terminal to start again with the re-transmission of the random access preamble signal, i.e., msg1, after an un-successful contention resolution. In other words, for some situation the (control) signaling overhead resulting from the contention resolution in the random access procedure can be avoided.

As mentioned above, in the context of system information acquisition there exist situations where two different mobile terminals are requesting the same on-demand system information message via the msg3. Then, in such a situation, it is not decisive for the mobile terminal to know whether itself (or the other one of the two different mobile terminal) has successfully placed its request set out in the system information request message or whether it is pre-scribed to re-transmits same system information request message in result to a contentious transmission.

As soon as it is ensured that the base station responding with msg4 has received the request for transmitting the desired system information message, the requests of both of the two different mobile terminals are met.

In other words, neither the cause (i.e., the understanding that collisions in the random access procedure have occurred) nor the effect (i.e., the re-transmissions as pre-scribed by the contention resolution mechanism) justifies the resulting (control) signal overhead. Rather, as soon as the base station complies with the requests of both of the two different mobile terminals, it is no longer necessary to apply the contention resolution mechanism of the random access procedure.

First Scenario

FIG. 1 illustrates a block diagram of a wireless communication system including a mobile terminal 110 (also referred to as user equipment, UE), and a base station 160 (also referred to as g Node B, gNB). This block diagram is used for describing the mechanism depicted in FIG. 2, namely the first scenario where the cause for the (control) signaling overhead is eliminated.

The wireless communication system of the block diagram permits the mobile terminal 110 to acquire system information, particularly other system information (which is not minimum system information) broadcasted on-demand from the base station 160 with a serving cell. Accordingly, both the mobile terminal 110 and the base station 160 take an active role in the system information acquisition.

In general, there exist multiple conditions when a processor 120 of the mobile terminal 110 determines (see step S01 in FIG. 2) that it has a demand for and thus wants to request on-demand the transmission of other system information from the base station 160.

For example, such a condition occurs, when the processor 120 detects a power-up event in the serving cell or a cell selection/reselection event to the serving cell. Such a condition can also occur, when the processor 110 is recovering from a loss of coverage event for the serving cell. Additionally, such a condition may also occur, when the processor 120 determines that a validity timer for the other system information has expired in the serving cell. In any one of these exemplary conditions, the processor 120 does not have a valid copy of the other system information.

Provided the processor 120 has determined a condition to request on-demand the transmission of other system information, it proceeds with a transceiver 130 of the mobile terminal 110 performing (see step S02 in FIG. 2) a random access procedure.

In the random access procedure, the transceiver 130 is first transmitting a random access preamble signal (see msg1 of S02 in FIG. 2) to the base station 160. Then, the transceiver 130 is receiving from the base station 160 a random access response message (see msg2 of S02 in FIG. 2). Thereafter, the transceiver 130 is transmitting to the base station 160 a system information request message (see msg3 of S02 in FIG. 2) for the other system information. And finally, the transceiver 130 is receiving from the base station 160 a contention resolution message (see msg4 of S02 in FIG. 2).

Provided the mobile terminal 110 has successfully placed a request for the other system information with the base station 160, it proceeds with the transceiver 130 receiving (see step S03 in FIG. 2) via broadcast a system information message including the on-demand requested other system information.

In order to the determine whether the mobile terminal 110 has successfully placed a request for the other system information with the base station 160, it determines whether the following two conditions are met:

1) the system information request message (see msg3 of S02 in FIG. 2) includes an information element with a bit-pattern conforming to a specific format with at least a part of the bit-pattern for requesting the other system information, and
2) the contention resolution message (see msg4 of S02 in FIG. 2) includes the same, or the same part of the bit-pattern for detecting collisions during the random access procedure.

The first of the two conditions ensures that the mobile terminal 110 places a commonly understood request for the other system information with the base station 160. For this purpose, the request is carried in an information element (e.g., of an RRC message) in a specific bit-pattern. Importantly, the bit pattern conforms to a specific format (e.g., a standardized format). The specific format prescribes that at least a part of the bit pattern is used for requesting the other system information. Thereby, the specific format permits unambiguously identifying at the base station 160 the requested other system information.

The second of the two conditions ensure that the mobile terminal 110 is notified whether the request for the other system information with the base station 160 is successfully placed. For this purpose, the contention resolution message includes the same bit-pattern (as a whole) or at least the same part of the bit-pattern prescribed by the specific format for requesting the other system information. Importantly, in case of the same bit-pattern or the same part of the bit-pattern are included in the contention resolution message, the mobile terminal 110 can detect collisions (better, the absence thereof) during the random access procedure.

Notably, with these two conditions the collision detection can be made on the bit-pattern basis or the part of the bit-pattern prescribed by the specific format. As all the requests for other system information have to conform to the same specific format, even when originating from two different mobile terminals, then the collision detection also assumes a successful placement in case of contentious transmissions from two different mobile terminals for the same request for other system information. Even more importantly, due to the specific format prescribing at least the part of the bit-pattern for the collision detection, the (control) signaling overhead is advantageously reduced.

These two conditions are exemplified in the detailed implementations shown in FIGS. 3 and 4.

FIGS. 3 and 4 depict in the top-most part exemplary bit-patterns and their specific formats for requesting the other system information. The first of the two figures details an implementation where the specific format prescribes that a part of the bit-pattern is used for requesting the other system information. And, the second of the two figures details an implementation where the specific format prescribes that the bit-pattern (as a whole) is use for requesting the other system information.

Particularly, for both the part of the bit-pattern and the bit-pattern (as a whole) the specific format defines a correspondence with requests for different types of system information messages (abbreviated as SI msg. 2 to 9). For example, the SI msg. 3 may denote the request to transmit, as part of the same system information message, the system information blocks of types 4-6. In both implementations, both the part of the bit-pattern and the bit pattern is 8 bits and each one of the 8 bits corresponds to a request for a different type of system information message (e.g., the second bit is shown to correspond to SI msg. 3 and the fourth bit is shown to correspond to the SI msg. 5).

With regard to the first of the two figures, it is shown that the specific format prescribes that the part of the bit-pattern (i.e., the 8 bits) for requesting the other system information message is located at the start (beginning) in the bit-pattern (i.e., the total 40 bits). This is shown in the left corner of the top-most part of the figure. Alternatively part of the bit-pattern (i.e., the 8 bits) for requesting the other system information message is located at the end (tail) in the bit-pattern (i.e., the total bits). This is shown in the right corner of the top-most part of the figure. Obviously the left and right corners of the top-most part of the figure depict alternative implementations for the specific format as denoted by the term "or."

It shall not go without saying that (also) in the first of the two figures, it is also shown that the specific format prescribes that the remaining bits of the bit-pattern, excluding the bits forming the part of the bit-pattern for requesting the other system information, have a zero value.

Figure 2:
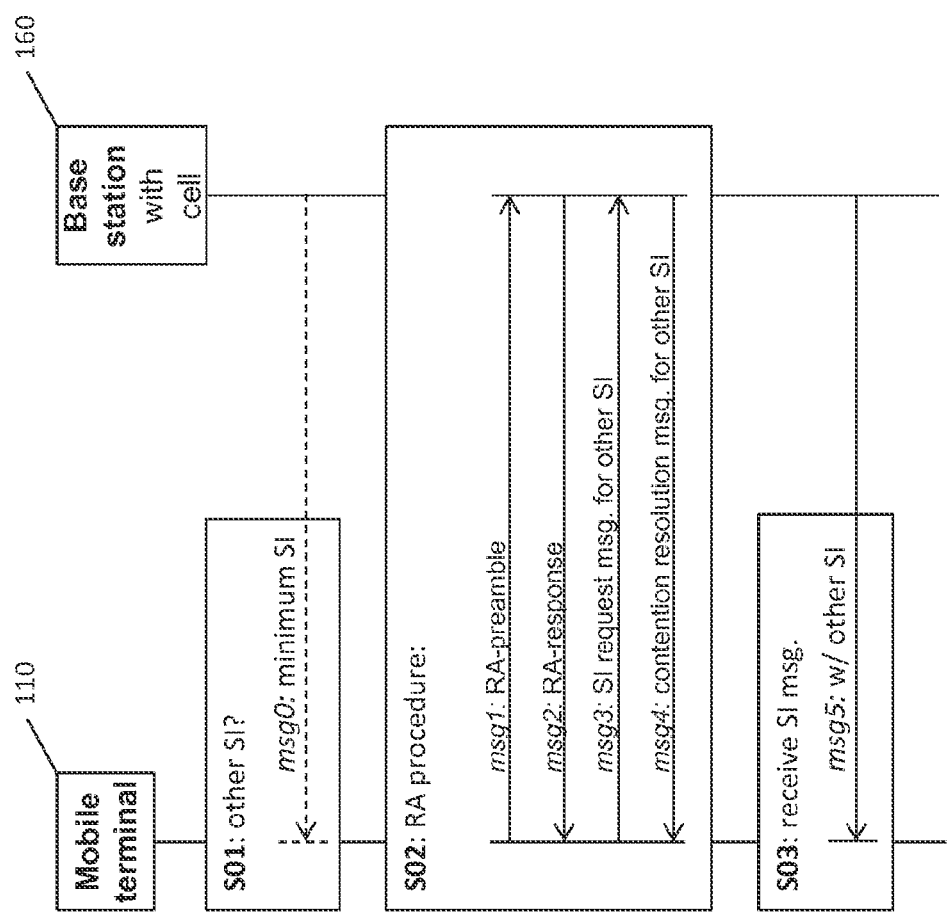
FIG. 2 illustrates a sequence diagram of system information acquisition according to an exemplary implementation of the first embodiment in a 3GPP NR deployment scenario.

Irrespective of which of the specific formats are used, the bit-pattern are included in an information element of an RRC message that resembles the system information request message (i.e., msg3 of S02 in FIG. 2). The information element can be the first information element in the system information request message or, more preferably the only information element in the system information request message (i.e., msg3), as also depicted in the two figures.

For conformance reasons with the current definitions in the RRC layer of 3GPP NR, it is advantageous when the bit-pattern has 40 bits. Thereby, the same sized MAC control element, CE, can be re-used as for the contention resolution message (e.g., msg4) transmitted in response to a RRC connection establishment message (e.g., msg3). Particularly, this prevents from necessitating different physical implementations for the contention resolution mechanisms in the base station and/or mobile station. Nevertheless, the bit-pattern may also only have a size of 8 bits (or at least 8 bits) to accommodate all bits corresponding to requests for different types of system information messages (abbreviated as SI msg. 2 to 9).

For clarification purpose, and to avoid confusions, the information element including the bit-pattern for requesting the other system information is not the one for the mobile terminal identity (termed: ue-identity in RRC) and/or not the one for the random value (termed: randomValue in RRC).

As generally known from 3GPP NR, the information element including the bit-pattern is encoded in a MAC SDU, resulting in an additional 8 bits encoding overhead at the start (beginning) of the MAC SDU, which together with the MAC header forms a MAC PDU, as shown in the left corner of the bottom part of both of the two figures. The mobile terminal 110 transmits this MAC PDU then as msg3 to the base station 160.

In response thereto, the detail implementations show, in the right corner of the bottom part of the two figures, that the mobile terminal 110 receives from the base station 11 a MAC message as contention resolution message, msg4, comprising a MAC header and a MAC CE. This MAC CE is depicted including or excluding an encoding overhead of additional 8 bits at the start (beginning) of the MAC CE.

Assuming for the sake of example, that the information element includes a bit pattern with a total size of 40 bits and that only a part of 8 bits from the total 40 bits is prescribed by the specific format for requesting other system information. Then the content resolution message, msg4, can include either the same bit-pattern (as a whole) resulting in a MAC CE with a size of 48 bits, or the same part of the bit-pattern prescribed by the specific format resulting in a MAC CE with a size of 8 bits.

In the first case, the successful/unsuccessful reception of the contention resolution message is determined by the processor 120 checking whether the contention resolution message, msg4, includes only (i.e., exactly) a same bit-pattern as transmitted with the information element included in the system information request message, msg3.

In the second case, the successful/unsuccessful reception of the contention resolution message is determined by the processor 120 checking whether the contention resolution message, msg4, is a special version of the contention resolution message (i.e., a shortened version) specifically used to acknowledge the on-demand request for other system information. Again, a shortened version does no longer conform to conventional MAC CE used in other contexts for contention resolution.

Additionally, the processor 120 is checking whether the msg4 includes only the same part of the bit-pattern (prescribed by the specific format for requesting other system information) as transmitted with the information element included in the system information request message, msg3.

Assuming now for the sake of example, that the information element includes a bit pattern with a total size of (only) 8 bits and that these bits are prescribed by the specific format for requesting other system information. Then the content resolution message, msg4, can include either the same bit-pattern (as a whole) with zero-padding at the end to amount to a large size of, for example, again 48 bits, or can include (only) the same bit-pattern (as a whole) resulting in a MAC CE with a size of 8 bits.

In the first case, the successful/unsuccessful reception of the contention resolution message is determined by the processor 120 checking whether part (i.e., the non-zero-padded bits) of the contention resolution message, msg4, include a same bit-pattern as transmitted with the information element included in the system information request message, msg3.

In the second case, the successful/unsuccessful reception of the contention resolution message is determined by the processor 120 checking whether the contention resolution message, msg4, is a special version of the contention resolution message (i.e., a shortened version) specifically used to acknowledge the on-demand request for other system information. Again, a shortened version does no longer conform to conventional MAC CE used in other contexts for contention resolution.

Additionally, the processor 120 is checking whether the msg4 includes a same bit-pattern as transmitted with an information element included in the system information request message, msg3, conforming to the specific format for requesting the other system information.

Second Scenario

Figure 5:
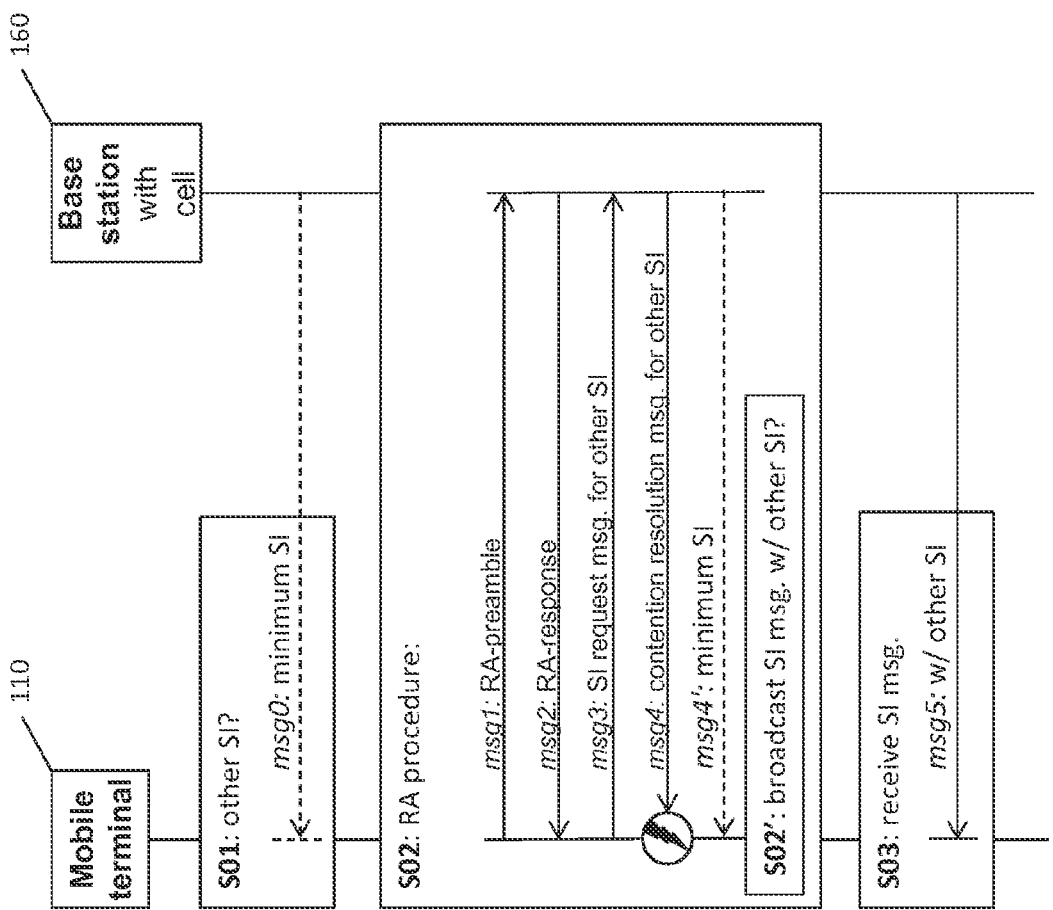
FIG. 5 illustrates a sequence diagram of system information acquisition according to an exemplary implementation of the first embodiment in a 3GPP NR deployment scenario.

Equally the block diagram of FIG. 1 can be used for describing the mechanism depicted in FIG. 5, namely the second scenario where the effect resulting in the (control) signaling overhead is removed without affecting the system functionality.

Again, the wireless communication system of the block diagram permits the mobile terminal to acquire system information, particularly other system information (which is not minimum system information) broadcasted on-demand from the base station 160 with a serving cell.

In general, there exist multiple conditions when a processor 120 of the mobile terminal 110 determines (see step S01 in FIG. 5) that it has a demand for and thus wants to request on-demand the transmission of other system information from the base station 160. For sake of brevity, reference is made to the exemplary conditions discussed above.

Provided the processor 120 has determined a condition to request on-demand the transmission of other system information, it proceeds with the transceiver 130 of the mobile terminal 110 performing (see step S02 in FIG. 5) a random access procedure.

In the random access procedure, the transceiver 130 is first transmitting a random access preamble signal (see msg1 of S02 in FIG. 5) to the base station 160. Then, the transceiver 130 is receiving from the base station 160 a random access response message (see msg2 of S02 in FIG. 5). Thereafter, the transceiver 130 is transmitting to the base station 160 a system information request message (see msg3 of S02 in FIG. 5) for the other system information. And finally, the transceiver 130 is receiving from the base station 160 a contention resolution message (see msg4 of S02 in FIG. 5).

Now differently from the above, this second scenario is concerned with a situation where, despite an unsuccessful reception of the contention resolution message (indicated by the flash to msg4), it is dispensable for the mobile terminal to start (begin) with the re-transmission of the random access preamble signal (msg1) as prescribed by the random access procedure.

Specifically, it is recognized that the unsuccessful reception can be the result from a conflicting request for other system information which is directed to the same (or subset of same) types of system information messages.

For example, a conflicting transmission could be detected even where one mobile terminal unsuccessfully places a request for SI msg. 3 and a second, different mobile terminal successfully places a request for SI msg. 3 and SI msg. 5. Then, even if the base station complies (only) with the successful request for SI msg. 3 and SI msg. 5, it would be dispensable for the unsuccessful mobile terminal to re-transmit the system information request (starting with msg1) as prescribed by the random access procedure.

This, however, depends on the question whether it can obtain information about the scheduled SI messages from an additional source, different from the msg4.

Importantly, it has been discovered that at specific timings (e.g., during radio frames and/or sub-frames with specific numbers), there is a high likelihood for two different mobile terminals to request as msg3 the same (or subset of same) types of system information messages. At least in these situations, the re-transmission of system information requests can be removed without affecting the performance of the system. Again for this, the unsuccessful mobile terminal has to be provided with information about the scheduled SI messages from an additional source.

For this purpose, in case of an unsuccessful reception (see flash in FIG. 5) of the contention resolution message, msg4, the mobile terminal 110 performs as part of the random access procedure (see S02 in FIG. 5) the following: First, the processor 130 suspends the re-transmission of the random access preamble signal, msg1. In other words, with suspending the re-transmission, the unsuccessful mobile terminal buys additional time to determine whether one of the above mention condition has occurred. In particular, the processor suspends the re-transmission until the next time instance of the minimum system information.

As already apparent from the previous section, the minimum system information is continuously broadcasted at specific periodic time intervals and, hence, does not require rely on on-demand requests. Importantly, the minimum system information (specifically the SystemInformation-Block Type 1, SIB1) includes an indicator which indicates whether an other system information message is currently broadcast or not with a validity until the end of the modification period.

In the context of the present disclosure, it is assumed that the base station 160 indicates with this indicator in the minimum system information, e.g., SIB1, which other system information, e.g., which types of system information messages it schedules for broadcasting until the end of the modification.

Coming back to the example, when the second different mobile terminal successfully places a request for SI msg. 3 and SI msg. 5, then the respective indicators in the minimum system information, e.g., SIB1, will give away information on the scheduled SI messages to all mobile terminals, not the one mobile terminal successfully placing its request.

By receiving this minimum system information all mobile terminals can infer which of the other system information is scheduled for transmission.

In line with the above, after suspending the re-transmission, the transceiver 120 receives (see msg4' in FIG. 5) at the next time instance, the minimum system information at the next time instance.

And further, the processor 130 determines (see step S02' in FIG. 5) based on the received minimum system information, if the requested other system information is scheduled for transmission via broadcast independent of the re-transmission thereof. In such a situation, the re-transmission as prescribed by the random access procedure is dispensable.

Having determined that the requested other system information is scheduled for transmission, the transceiver 120 proceeds with receiving (see step S03 in FIG. 5) via broadcast a system information message including the on-demand requested other system information.

In summary, due to the separate (additional) reception operation (see msg4' in FIG. 5) of minimum system information, the mobile terminal 110 can discover situations where, despite the fact of having been unsuccessful in placing the request for other system information, the mobile terminal can dispense with the re-transmissions as prescribed by the random access procedure.

Thus, according to this second scenario the effect resulting in the (control) signaling overhead is removed without affecting the system functionality.

Referring again to the general description of FIG. 1, the advantageous implementation in 3GPP NR deployment scenario includes that the system information request message, msg3, is a radio resource control, RRC, message, preferably with the information element having a total size of 40 bits. And the advantageous implementation additionally includes that the contention resolution message, msg4, is a medium access control, MAC, control element, CE, preferably having a total size of 48 bits. Thereby, compatibility with existing formats in the random access procedure (e.g., the RRC connection request) can be ensured.

It goes without saying that also the system information can be acquired by the mobile terminal in one of the RRC_CONNECTED, RRC_IDLE, and RRC_INACTIVE state.

Second Aspects

Referring now to a different second aspect of the present disclosure. This second aspect stands separately from the previous description, even if it also relates to system information acquisition. More specifically, also here the system information also includes minimum system information and other system information.

Notably the difference over the previous description lies in the fact that the second aspect concerns itself with the object to increase the flexibility in acquiring the system information. This increase in flexibility may result in a reduced delay, i.e., in a reception of on-demand requested other system information ahead of schedule, and/or may result in reduced (control) signaling overhead. In any case, the following aspect ties in with the specification of the modification period.

Generally, the modification period is well understood to describe a time period during which a mobile terminal is expected to only once acquire the system information. This modification period is introduced to safeguard the power consumption, for example, of mobile terminals in the RRC_IDLE or RRC_INACTIVE state. Should the mobile terminal be expected to wake up and acquire system information more frequently, then this would result in a negative impact on the mobile terminal's power consumption.

However, there are situations where the mobile terminal is, in one modification period, requesting on-demand other system information, however is required by due to system constraints, to only receive, during the next modification, the on-demand requested other system information. This introduces a considerable delay upon the system information acquisition within the wireless communication system.

Figure 6:
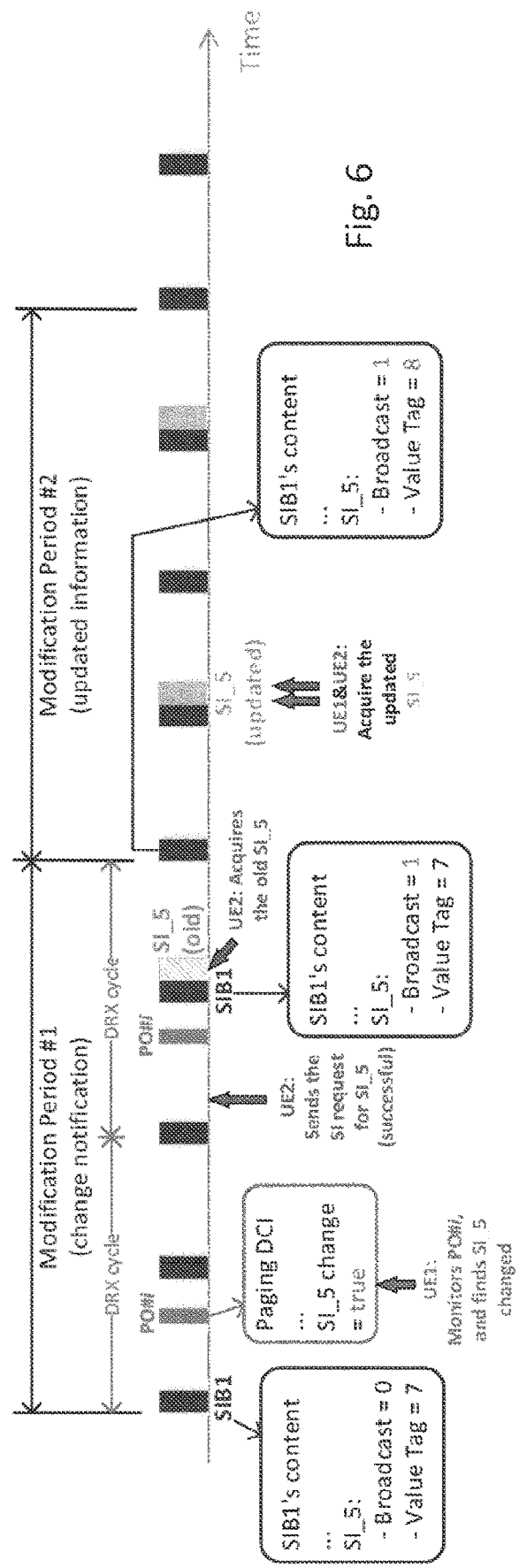
FIG. 6 shows a timing diagram of two mobile terminals (i.e., UE1 and UE2) performing system acquisition in a first example of the second aspect in a 3GPP NR deployment scenario.

In this situation, this aspect increases the flexibility by permitting the system to more flexibly broadcast other system information, as shown in the implementation of FIG. 6.

FIG. 6 depicts a timing diagram of two mobile terminals (i.e., UE1 and UE2) performing system acquisition in a first example of this second aspect in a 3GPP NR deployment scenario. In this first example, a wireless communication system is shown comprising two mobile terminals (i.e., UE1 and UE2) and a base station with a serving cell.

At the start of the first modification period (modification period #1), the other system information, e.g., the system information message 5 (SI_5), is not broadcasted. This is shown by the respective indicator in the minimum system information, e.g., system information block type 1 (SIB1), having a value of zero ("broadcast=0").

Thus, a mobile terminal with a demand for such other system information (e.g., SI_5) has to proceed with requesting on-demand the transmission thereof. This shall be discussed in further detail with regard to the system information acquisition performed by the second mobile terminal, i.e., UE2 as shown in this FIG. 6.

This mobile terminal, UE2, determines, at the time point indicated with the arrow in FIG. 6, that a condition has occurred for on-demand requesting other system information (e.g., SI_5). For sake of brevity, reference is made to the exemplary conditions discussed above.

It goes without saying that the determining the on-demand requesting condition, includes that the mobile terminal acquires the minimum system information (e.g., SIB1) and basis its determination on this received minimum system information (e.g., SIB1). Only when the mobile terminal determines that the other system information (e.g., SI_5) is transmitted on-demand ("broadcast=0"), then it actually begins with the random access procedure.

The mobile terminal UE2 performs a random access procedure including: transmitting a random access preamble message (msg1), receiving a random access response message (msg2), transmitting a system information request message (msg3) for the other system information, and receiving a contention resolution message (msg4).

In a conventional configuration, the mobile terminal would have to wait until the next modification period (e.g., modification period #2) to receive via broadcast a system information message including the on-demand requested other system information (e.g., SI_5). In this particular case, this modification period is also carrying changed (new) other system information (e.g., SI_5), which however has no impact on the first example.

Different therefrom, in this example, the mobile terminal, UE2, can receive ahead of schedule.

For this purpose, the mobile terminal UE2 is configured to (again) re-acquire, within a current modification period (e.g., modification period #1) that is the same of the random access procedure, minimum system information (e.g., SIB1). Based on this re-acquired minimum system information (e.g., SIB1), the mobile terminal determines whether the on-demand requested other system information (e.g., SI_5) is being transmitted ahead of the next modification period (e.g., "broadcast=1"). And the mobile terminal receives the on-demand requested other system information (e.g., SI_5) included in the system information message being transmitted ahead of the next modification period (ahead of modification period #2).

Notably, the current (old) not the changed (new) other system information (e.g., SI_5) is broadcasted in this modification period (e.g., modification period #1). Thus, it will have to receive in the next modification period again the changed (new) other system information (e.g., SI-5). Despite the repetition, this example advantageously allows for a consistent implementation of the modification period with the current standardization.

In summary, this first example provides for the advantages of having less specification impact; and allowing the UE2 obtain SI_5 immediately. There is no impact on other mobile terminals (UE1). These advantages come at a price of the following disadvantages: SI request overhead increases for a soon changed (new) SI; which in effect leads to more power consumption for UE2 (needs to check the SIB1 in two in two continuous modification periods after requesting on-demand the other system information), and more SI broadcast overheads.

Figure 7:
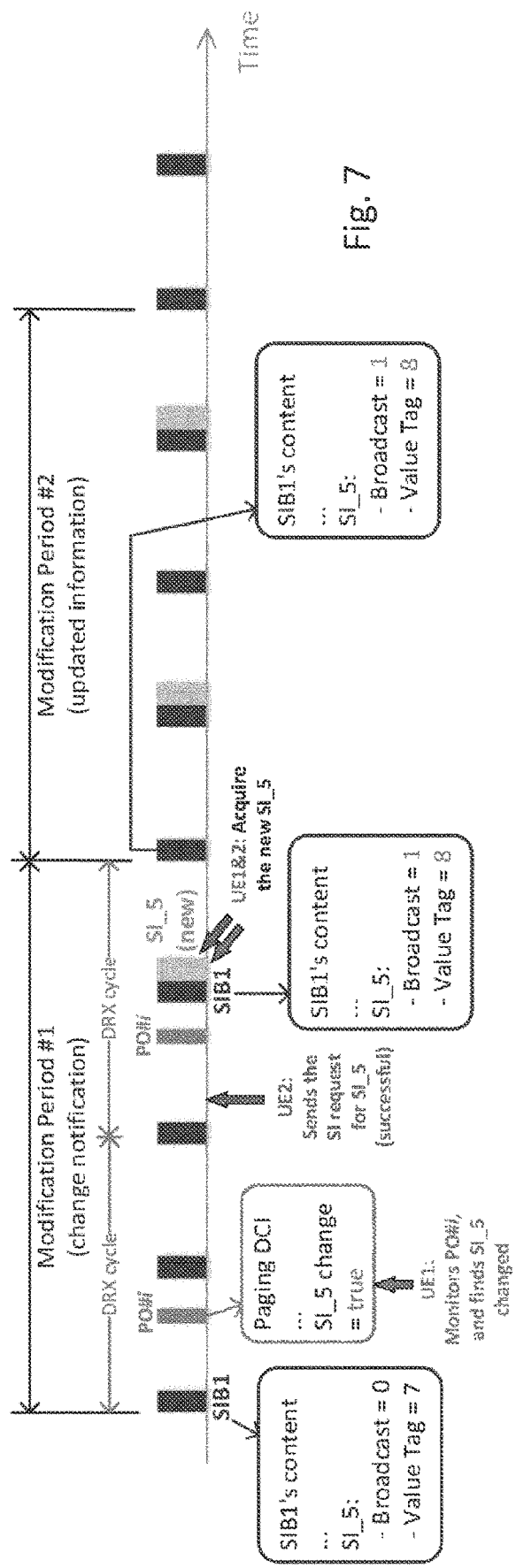
FIG. 7 depicts a timing diagram of two mobile terminals (i.e., UE1 and UE2) performing system acquisition in a second example of the second aspect in a 3GPP NR deployment scenario.

FIG. 7 depicts a timing diagram of two mobile terminals (i.e., UE1 and UE2) performing system acquisition in a second example of this second aspect in a 3GPP NR deployment scenario. In this second example, a wireless communication system is shown comprising two mobile terminals (i.e., UE1 and UE2) and a base station with a serving cell.

At the start of the first modification period (modification period #1), the other system information, e.g., the system information message 5 (SI_5), is not broadcasted. This is shown by the respective indicator in the minimum system information, e.g., system information block type 1 (SIB1), having a value of zero ("broadcast=0").

Thus, a mobile terminal with a current version of the other system information (e.g., SI_5) would not have any incentive to proceed with acquiring again the transmission thereof. This however changes when the mobile terminal is indicated a change (update) of the other system information (e.g., SI_5). This shall be discussed in further detail with regard to the system information acquisition performed by the first mobile terminal, i.e., UE1 as shown in this FIG. 7.

For the sake of clarity, it is emphasized that the mobile terminal UE1 already has a current version of the other system information (e.g., SI_5). The mobile terminal UE1 may have received same by acquiring system information as discussed above, namely by first determining whether a condition for on-demand requesting other system information (e.g., SI_5) has occurred, and then performing the random access procedure. Finally, the mobile terminal UE 1 may have received the on-demand requested other system information (e.g., SI_5) as discussed above.

Now, for the purpose of receiving changed (updated) other system information, the mobile terminal UE1 receive a paging message (located in the paging occasion, PO, with number #i for the UE1). This paging message indicates a change in the on-demand requested other information message (e.g., "SI_5 change=true"). This paging message is received in a current modification period (modification period #1).

Then, the mobile terminal UE1 re-acquires, within a current modification period that is the same of the received paging message (modification period #1), every minimum system information (e.g., SIB1).

At the same time the mobile terminal, UE2, determines, at the time point indicated with the arrow in FIG. 7, that a condition has occurred for on-demand requesting other system information (e.g., SI_5).

It goes without saying that the determining the on-demand requesting condition, includes that the mobile terminal acquires the minimum system information (e.g., SIB1) and basis its determination on this received minimum system information (e.g., SIB1). Only when the mobile terminal determines that the other system information (e.g., SI_5) is transmitted on-demand ("broadcast=0"), then it actually begins with the random access procedure.

The mobile terminal UE2 performs a random access procedure including: transmitting a random access preamble message (msg1), receiving a random access response message (msg2), transmitting a system information request message (msg3) for the other system information, and receiving a contention resolution message (msg4). And in this example the base station successfully receives the on-demand system information request from UE2, and thereafter changes the indicator of the requested other system information (e.g., SI_5) in the minimum system information.

Further, the mobile terminal UE1 is adapted to determine, based on re-acquired minimum system information (e.g., SIB1), whether the changed on-demand other system information (e.g., new SI_5) is being transmitted ("broadcast=1") ahead of the next modification period (ahead of the modification period #2), due to the on-demand other system information request sent by UE2.

Finally, both mobile terminals UE1 and UE2 receive the changed on-demand other system information (e.g., SI_5) included in the system information message being transmitted ahead of the next modification period (ahead of modification period #2).

In summary, this second example provides for the advantages of enabling both UE1 and UE2 to acquire the updated SI_5 immediately; resulting in less power consumption for UE2 (only needs to acquire the SI_5 once). These advantages come at a price of the following disadvantages: different UEs may operate based on different other system information, e.g., SI_5, in the same modification period; more SI broadcast overheads; more power consumption for UE1; more specification impact.

FIG. 8 depicts a timing diagram of two mobile terminals (i.e., UE1 and UE2) performing system acquisition in a third example of this second aspect in a 3GPP NR deployment scenario. In this third example, a wireless communication system is shown comprising two mobile terminals (i.e., UE1 and UE2) and a base station with a serving cell.

At the start of the first modification period (modification period #1), the other system information, e.g., the system information message 5 (SI_5), is not broadcasted. This is shown by the respective indicator in the minimum system information, e.g., system information block type 1 (SIB1), having a value of zero ("broadcast=0").

Thus, a mobile terminal with a demand for such other system information (e.g., SI_5) would have to proceed with requesting on-demand the transmission thereof. An alternative configuration shall be discussed in further detail with regard to the system information acquisition performed by the second mobile terminal, i.e., UE2 as shown in this FIG. 8.

Particularly, it is assumed in the following that the mobile terminal UE2 only performs the random access procedure, as discussed before, when the following procedure is determined to be unsuccessful until the end of the current modification period.

Again, prior to performing the random access procedure, the mobile terminal UE2 receives, a paging message (located in the paging occasion, PO, with number #k for any UE) for a different mobile terminal (e.g., UE1) indicating a change in the on-demand requested other system information (e.g., SI_5) in a current modification period (modification period #1).

Then, the mobile terminal UE2 determines, based on the paging message (e.g., located in PO #k) for the different mobile terminal (e.g., UE1), whether the on-demand requested other system information is being transmitted (i.e., "SI_5 change=true") in the next modification period (modification period #2)

Finally, the mobile terminal UE2 skips performing the random access procedure, and subsequently, the mobile terminal UE2 receives the on-demand requested other system information (e.g., SI_5) included in the system information message being transmitted in the next modification period (modification period #2).

In summary, this third example provides for the advantages of reducing the number of on-demand SI request; thereby the SI broadcast overhead is reduced; and further a minimal specification impact is achieved. These advantages come at a price of the following disadvantage: more latency to acquire the missing SI.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

According to a first aspect, a mobile terminal is disclosed for performing system information acquisition in a wireless communication system comprising at least one base station configured with a serving cell. The system information includes minimum system information and other system information.

The mobile terminal comprises a processor and a transceiver. With this, the mobile terminal is adapted to determine a condition for requesting on-demand a transmission of other system information; perform a random access procedure including: transmitting a random access preamble signal (msg1), receiving a random access response message (msg2), transmitting a system information request message (msg3) for the other system information, and receiving a contention resolution message (msg4); and receive via broadcast a system information message including the on-demand requested other system information.

The system information request message (msg3) includes an information element with a bit-pattern conforming to a specific format with at least a part of the bit-pattern for requesting the other system information, and the contention resolution message (msg4) includes the same, or the same part of the bit-pattern for detecting collisions during the random access procedure.

According to a second aspect, which can be combined with the first aspect, the information element is the first information element in the system information request message (msg3).

According to a third aspect, which can be combined with the first or second aspect, the information element is the only information element in the system information request message (msg3).

According to a fourth aspect, which can be combined with the first to third aspect, the information element is not mobile terminal identity information element and/or not a random value information element.

According to a fifth aspect, which can be combined with the first to fourth aspect, the information element with a bit-pattern conforming to the specific format comprises at least 8 bits, preferably 40 bits.

According to a sixth aspect, which can be combined with the first to fifth aspect, the specific format defines, for the part of the bit-pattern of the information element, a correspondence with requests for different types of system information messages.

According to a seventh aspect, which can be combined with the sixth aspect, the part of the bit-pattern of the information element is 8 bits, and each of the 8 bits corresponds to a request for a different type of a system information message, According to an eighth aspect, which can be combined with the sixth or seventh aspect, the specific format prescribes that the part of the bit-pattern, preferably the 8 bits, are located at the start or at the end in the bit pattern.

According to a ninth aspect, which can be combined with the sixth to eighth aspect, the specific format prescribes that all remaining bits in the bit pattern of the information element, except those of the part of the bit-pattern, have a zero value.

According to a tenth aspect, which can be combined with the first to ninth aspect, the mobile terminal begins receiving the system information message including the on-demand requested other system information depending on the bit-pattern in the contention resolution message (msg4).

According to an eleventh aspect, a mobile terminal is disclosed for performing system information acquisition in a wireless communication system comprising at least one base station configured with a serving cell. The system information including minimum system information and other system information.

The mobile terminal comprises: a processor and a transceiver adapted to determine a condition for requesting on-demand a transmission of other system information; perform a random access procedure including: transmitting a random access preamble signal (msg1), receiving a random access response message (msg2), transmitting a system information request message (msg3) for the other system information, and receiving a contention resolution message (msg4); and receive via broadcast a system information message including the on-demand requested other system information.

In case of an unsuccessful reception of the contention resolution message (msg4), the mobile terminal performing a random access procedure including: suspending the re-transmission of the random access preamble signal (msg1) until the next time instance of the minimum system information, receiving, at the next time instance, the minimum system information, and determining, based on the received minimum system information, if the requested other system information is scheduled for transmission via broadcast independent of the re-transmission thereof.

According to a twelfth aspect, which can be combined with the first to eleventh aspect, the successful/unsuccessful reception of the contention resolution message (msg4) is determined by at least one of:

checking whether the contention resolution message (msg4) includes only a same bit-pattern as transmitted with the information element included in the system information request message (msg3) conforming to the specific format for requesting the other system information, and checking whether the contention resolution message (msg4) is a special version of the contention resolution message used to acknowledge the on-demand request for other system information, and whether the msg4 includes only the same part of the bit-pattern as transmitted with the information element included in the system information request message (msg3), and checking whether part of the contention resolution message (msg4) includes a same bit-pattern as transmitted with the information element included in the system information request message (msg3) conforming to a specific format for requesting the other system information, and checking whether the contention resolution message (msg4) is a special version of the contention resolution message used to acknowledge the on-demand request for other system information, and whether the msg4 includes a same bit-pattern as transmitted with an information element included in the system information request message (msg3) conforming to the specific format for requesting the other system information.

According to a thirteenth aspect, which can be combined with the first to twelfth aspect, the system information request message (msg3) is a radio resource control, RRC, message, preferably with the information element having a total size of 40 bits.

According to a fourteenth aspect, which can be combined with the first to thirteenth aspect, the contention resolution message (msg4) is a medium access control, MAC, control element, CE, preferably having a total size of 48 bits.

According to a fifteenth aspect, which can be combined with the first to fourteenth aspect, for performing the system information acquisition, the mobile terminal is in one of the RRC_CONNECTED, RRC_IDLE, and RRC_INACTIVE state.

According to a sixteenth aspect, which can be combined with the first to fifteenth aspect, the condition for requesting on-demand the transmission of the other system information includes at least one of: detecting a power-up event in or a cell selection/reselection event to the serving cell, recovering from a loss of coverage event for the serving cell, determining that a validity timer for the other system information has expired.

According to a seventeenth aspect, a base station is disclosed in a wireless communication system enabling a mobile terminal to perform system information acquisition with the base station configured with a serving cell. The system information including minimum system information and other system information, The base station comprises: a processor and a transceiver. With this, the base station is adapted to perform a random access procedure including: receiving a random access preamble signal (msg1), transmitting a random access response message (msg2), receiving a system information request message (msg3) for other system information, and transmitting a contention resolution message (msg4); and to transmit via broadcast a system information message including the on-demand requested other system information.

The system information request message (msg3) includes an information element with a bit-pattern conforming to a specific format with at least a part of the bit-pattern for requesting the other system information, and the contention resolution message (msg4) includes the same, or the same part of the bit-pattern for detecting collisions during the random access procedure.

According to an eighteenth aspect, which can be combined with the seventeenth aspect, the information element is the first information element in the system information request message (msg3).

According to a nineteenth aspect, which can be combined with the seventeenth or eighteenth aspect, the information element is the only information element in the system information request message (msg3).

According to a twentieth aspect, which can be combined with the seventeenth to nineteenth aspect, the information element is not mobile terminal identity information element and/or not a random value information element.

According to a twenty-first aspect, which can be combined with the seventeenth to twentieth aspect, the information element with a bit-pattern confirming with the specific format comprises at least 8 bits, preferably 40 bits.

According to a twenty-second aspect, which can be combined with the seventeenth to twenty-first aspect, the specific format defines, for a subset of bits in the bit-pattern of the information element, a correspondence with requests for different types of system information messages.

According to a twenty-third aspect, which can be combined with the twenty-second aspect, the subset of bits in the bit-pattern of the information element is 8 bits, and each of the 8 bits corresponds to a request for a different type of a system information message.

According to the twenty-fourth aspect, which can be combined with the twenty-second or twenty-third aspect, the specific format prescribes that the subset of bits, preferably the 8 bits, are located at the start or at the end in the bit pattern.

According to a twenty-fifth aspect, which can be combined with the twenty-second to twenty-fourth aspect, the specific format prescribes that all remaining bits in the bit pattern of the information element, except those of the subset of bits, have a zero value.

According to the twenty-sixth aspect, which can be combined with the seventeenth to twenty-fifth aspect, the base station begins transmitting the system information message including the on-demand requested other system information depending on the bit-pattern in the contention resolution message (msg4).

According to a twenty-seventh aspect, a method is disclosed for performing system information acquisition by a mobile terminal in a wireless communication system comprising at least one base station configured with a serving cell. The system information including minimum system information and other system information.

The method comprises the steps of: determining a condition for requesting on-demand a transmission of other system information; performing a random access procedure including: transmitting a random access preamble signal (msg1), receiving a random access response message (msg2), transmitting a system information request message (msg3) for the other system information, and receiving a contention resolution message (msg4); and receiving via broadcast a system information message including the on-demand requested other system information.

The system information request message (msg3) includes an information element with a bit-pattern conforming to a specific format with at least a part of the bit-pattern for requesting the other system information, and the contention resolution message (msg4) includes the same, or the same part of the bit-pattern for detecting collisions during the random access procedure.

According to a twenty-eight method, a method is disclosed for performing system information acquisition by a mobile terminal in a wireless communication system comprising at least one base station configured with a serving cell. The system information including minimum system information and other system information.

The method comprises the steps of: determining a condition for requesting on-demand a transmission of other system information; performing a random access procedure including: transmitting a random access preamble signal (msg1), receiving a random access response message (msg2), transmitting a system information request message (msg3) for the other system information, and receiving a contention resolution message (msg4); and receiving via broadcast a system information message including the on-demand requested other system information.

In case of an unsuccessful reception of the contention resolution message (msg4), performing a random access procedure includes: suspending the re-transmission of the random access preamble signal (msg1) until the next time instance of the minimum system information, receiving, at the next time instance, the minimum system information, and determining based on the received minimum system information, if the requested other system information is scheduled for transmission via broadcast independent of the re-transmission thereof.

According to a twenty-ninth aspect, a method for a base station is disclosed to enable a mobile terminal to perform system information acquisition in a wireless communication system with the base station configured with a serving cell. The system information including minimum system information and other system information.

The method comprises the steps of: performing a random access procedure including: receiving a random access preamble signal (msg1), transmitting a random access response message (msg2), receiving a system information request message (msg3) for other system information, and transmitting a contention resolution message (msg4); and transmitting via broadcast a system information message including the on-demand requested other system information.

The system information request message (msg3) includes an information element with a bit-pattern conforming to a specific format with at least a part of the bit-pattern for requesting the other system information, and the contention resolution message (msg4) includes the same, or the same part of the bit-pattern for detecting collisions during the random access procedure.

According to a thirtieth aspect, a mobile terminal is disclosed for performing system information acquisition in a wireless communication system comprising at least one base station with a serving cell. The system information includes minimum system information and other system information.

The mobile terminal comprises a processor and a transceiver. With this, the mobile terminal is adapted to determine a condition for on-demand requesting other system information, to perform a random access procedure including: transmitting a random access preamble message (msg1), receiving a random access response message (msg2), transmitting a system information request message (msg3) for the other system information, and receiving a contention resolution message (msg4), and to receive via broadcast a system information message including the on-demand requested other system information.

Particularly, the mobile terminal is adapted, as part of determining the on-demand requesting condition, to acquire the minimum system information and to determine that the other system information being requested is transmitted on-demand.

Further, the mobile terminal is adapted, as part of receiving the system information message, to re-acquire, within a current modification period that is the same of the random access procedure, minimum system information, to determine, based on the re-acquired minimum system information whether the on-demand requested other system information is being transmitted ahead of the next modification period, and to receive the on-demand requested other system information included in the system information message being transmitted ahead of the next modification period.

According to a thirty-first aspect, a mobile terminal is disclosed for performing system information acquisition in a wireless communication system comprising at least one base station with a serving cell. The system information includes minimum system information and other system information.

The mobile terminal comprises a processor and a transceiver. With this, the mobile terminal is adapted to determine a condition for on-demand requesting other system information, to perform a random access procedure including: transmitting a random access preamble message (msg1), receiving a random access response message (msg2), transmitting a system information request message (msg3) for the other system information, and receiving a contention resolution message (msg4), and to receive via broadcast a system information message including the on-demand requested other system information.

Particularly, the mobile terminal is adapted, as part of receiving the system information message, to receive a paging message indicating a change in the on-demand requested other system information in a current modification period, to re-acquire, within a current modification period that is the same of the received paging message, minimum system information, to determine, based on re-acquired minimum system information, whether the changed on-demand other system information is being transmitted ahead of the next modification period, and to receive the changed on-demand other system information included in the system information message being transmitted ahead of the next modification period.

According to a thirty-second aspect, a mobile terminal is disclosed for performing system information acquisition in a wireless communication system comprising at least one base station with a serving cell. The system information includes minimum system information and other system information.

The mobile terminal comprises a processor and a transceiver. With this, the mobile terminal is adapted, to determine a condition for on-demand requesting other system information, to perform a random access procedure including: transmitting a random access preamble message (msg1), receiving a random access response message (msg2), transmitting a system information request message (msg3) for the other system information, and receiving a contention resolution message (msg4), and to receive via broadcast a system information message including the on-demand requested other system information.

Particularly, the mobile terminal is adapted, prior to performing the random access procedure, to receive a paging messages for a different mobile terminal indicating a change in the on-demand requested other system information in a current modification period, to determine, based on the paging message for the different mobile terminal, whether the on-demand requested other system information is being transmitted in the next modification period, to skip performing the random access procedure, and to receive the on-demand requested other system information included in the system information message being transmitted in the next modification period.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit for controlling a base station to enable a mobile terminal to acquire system information including minimum system information and other system information, the integrated circuit comprising:
processing circuitry and transceiver circuitry, which, in operation
performs a random access procedure including: receiving a random access preamble signal from the mobile terminal, transmitting a random access response message to the mobile terminal, receiving, from the mobile terminal, a system information request message requesting on-demand transmission of the other system information, and transmitting a contention resolution message to the mobile terminal; and
transmits via broadcast a system information message including the on-demand requested other system information;
wherein the system information request message includes an information element with a bit-pattern conforming to a specific format with at least a part of the bit-pattern for requesting the other system information, and
wherein the contention resolution message includes the same, or the same part of the bit-pattern, for detecting collisions during the random access procedure.

2. The integrated circuit according to claim 1,
wherein the information element is the first information element in the system information request message, and/or
wherein the information element is the only information element in the system information request message, and/or
wherein the information element is not mobile terminal identity information element and/or not a random value information element,
and/or
the information element with the bit-pattern confirming to the specific format comprises at least 8 bits.

3. The integrated circuit according to claim 1,
wherein the specific format defines, for a subset of bits in the bit-pattern of the information element, a correspondence with requests for different types of system information messages,
and
wherein the subset of bits in the bit-pattern of the information element is 8 bits, and each of the 8 bits corresponds to a request for a different type of a system information message,
and further
wherein the specific format prescribes that the subset of bits are located at the start or at the end in the bit pattern,
and even further,
wherein the specific format prescribes that all remaining bits in the bit pattern of the information element, except those of the subset of bits, have a zero value.

4. The integrated circuit according to claim 1, wherein the processing circuitry and transceiver circuitry, in operation
begins transmitting the system information message including the on-demand requested other system information depending on the bit-pattern in the contention resolution message.

* * * * *